UNITED STATES PATENT OFFICE.

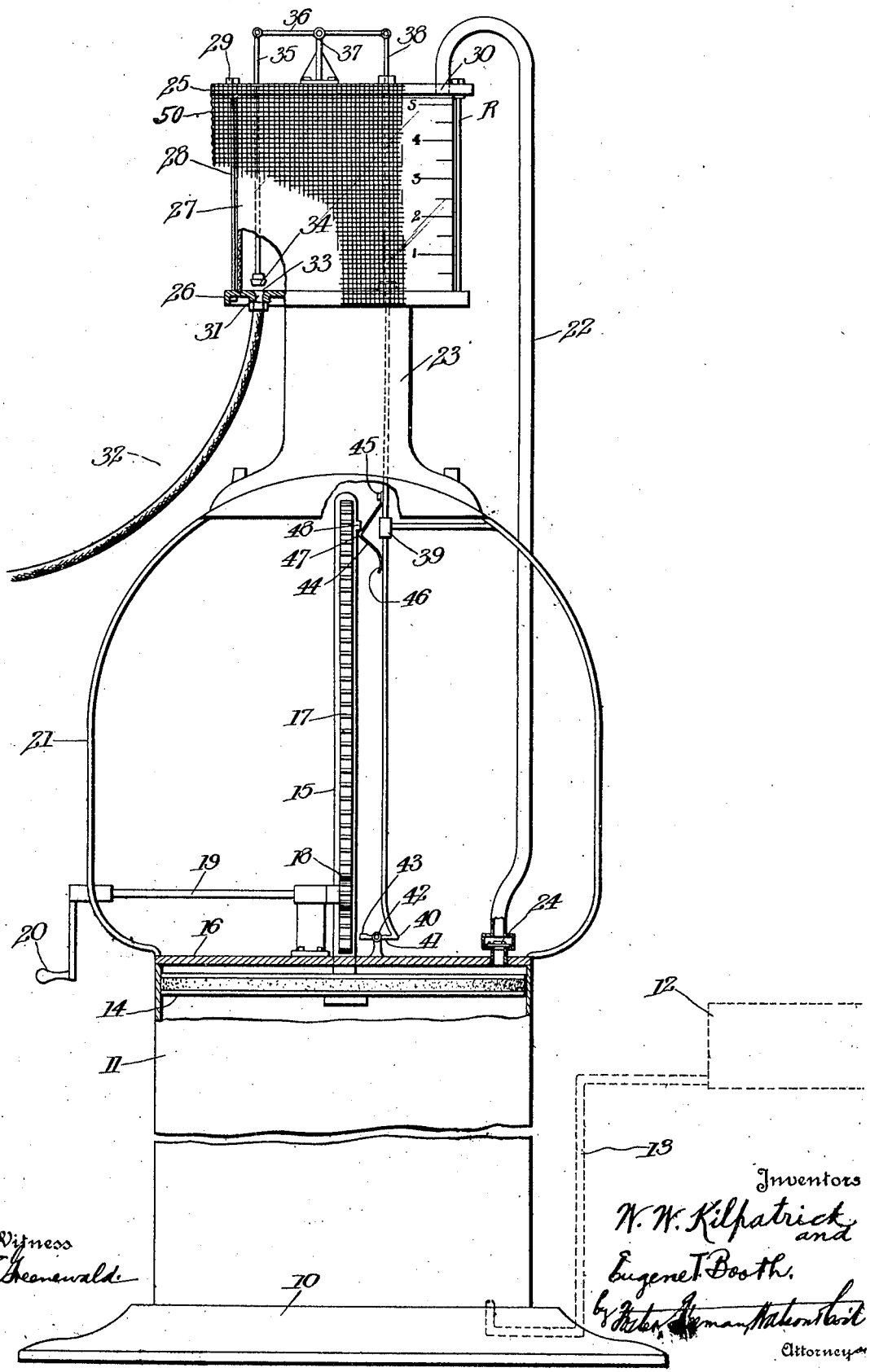

WALTER W. KILPATRICK AND EUGENE T. BOOTH, OF ATLANTA, GEORGIA.

GASOLENE-VENDING MACHINE.

1,308,713.  Specification of Letters Patent.  Patented July 1, 1919.

Application filed March 9, 1917. Serial No. 153,684.

*To all whom it may concern:*

Be it known that we, WALTER W. KILPATRICK and EUGENE T. BOOTH, citizens of the United States, residing at Atlanta, in the county of Fulton and State of Georgia, have invented certain new and useful Improvements in Gasolene-Vending Machines, of which the following is a description.

This invention relates to liquid vending machines and more particularly to an improved measuring mechanism for gasolene vending machines.

Ordinarily persons buying gasolene from pumping stations have no correct register of the amount of gasolene that flows through the pipes to the tank on their automobile. The pumps are so arranged and adjusted that each time the piston of the pump is reversed by a crank, a predetermined amount of gasolene is said to be delivered to the gasolene tank on the automobile. There is, however, no way for the purchaser to know whether he is getting his correct measure, since the packing rings or leathers on the piston head in the pump supplying the gasolene due to its constant use may leak and when the piston travels forward to force the gasolene through the supply pipes to the automobile tank, a certain amount of gasolene may leak by these packing rings and thus the purchaser will not get the amount for which he is paying.

The object of this invention is, therefore, to provide a measuring device attachable to the ordinary pumping mechanism of a gasolene supply station so that the purchaser may see how much gasolene he is getting and thereby insure that a correct and full measure is delivered to his gasolene tank.

The above and other objects and novel features of this invention will be apparent from the following description taken in connection with the drawing, which forms a part of this specification.

The drawing illustrates a gasolene pumping mechanism equipped with a measuring mechanism embodying this invention.

Referring to the drawing, the base 10 supports a liquid or gasolene container 11 in the form of a cylinder which is supplied with gasolene in the usual manner from an underground tank 12 and pipe 13 indicated in dotted lines. The piston head 14 works up and down in the cylinder 11 and has a stem or rod 15 rigidly connected to it and extending upwardly therefrom through the cover 16 of the cylinder. One face of the piston rod 15 is provided with a rack 17 and a pinion 18 on the crank shaft 19 is adapted to mesh with the rack 17 and reciprocate the piston 14 when the crank shaft 19 is turned by the crank handle 20 on the outside of the casing 21 which incloses the aforementioned parts.

On its up stroke the piston head 14 is designed to force gasolene from the container 11 through a pipe 22 into the receiver R, mounted on a standard 23 carried by the upper end of the casing 21. The pipe 22 is attached to the head or upper end 16 of the cylinder 11 and near its attached end it has a check valve 24 which prevents the return of the liquid forced into the pipe 22 by the piston 14.

The receiver R consists of upper and lower metal ends 25 and 26 which hold in place between them a glass cylinder 27. The glass cylinder 27 is transparent and is marked in gallons as indicated, so that the purchaser may see at a glance how much gasolene is being delivered to his tank. The receiver R shown in the drawing is arranged to hold a little more than five gallons of gasolene so that the purchaser will be able to see that he is getting exactly the amount he has paid for. It will be understood that a glass tube marked as indicated and attached to a metal receiver may also be used to indicate the amount of gasolene in the receiver. The upper and lower ends of the glass cylinder 27 rest in suitably packed grooves in the opposed faces of the upper and lower plates 25 and 26, and the plates are clamped tightly to the ends of the cylinder 27 by means of rods 28 which extend between the plates 25, 26 and are secured by nuts 29 threaded on the ends of the rods 28.

The upper plate 25 has an opening 30 in it which constitutes the inlet of the receiver R and to which the upper end of the pipe 22 is connected. The lower plate 26 has an opening 31 therein which constitutes the outlet of the receiver R. The outer end of the opening 31 is provided with a nipple to which a pipe or hose 32 may be attached, which pipe or hose constitutes the conduit for leading the gasolene to an automobile gasolene tank.

The inner end of the opening 31 is beveled so as to form a seat 33 for the valve 34 which controls the flow of liquid from the receiver R to the conduit 32. The valve 34 is carried by a rod 35 which extends upwardly through the receiver R and out through an opening in the top plate 25. The valve rod 35 is connected to one end of a lever 36 which is mounted between its ends on a fulcrum 37. The opposite end of the lever 36 is connected to an operating rod 38 which extends downwardly through packed openings in the top and bottom plates 25 and 26 and also extends through a guide 39 within the casing 21. The lower end of the operating rod 38 is bent outwardly as at 40 and then horizontally as at 41. The horizontal portion 41 of the operating rod is pivoted intermediate its ends at 42 leaving a free end 43, by means of which the rod on the opposite side of the fulcrum 42 may be raised to close the valve 34 to its seat 33. One end of a spring 44 is attached at 45 to the operating rod 38 and the other end 46 of the spring is free to move independently of the rod. The spring 44 is V-shaped and its apex 47 extends upwardly away from the rod 38 and is located in the path of a lug 48 on the side of the piston rod 15. In the position shown in the drawing, the piston head 14 and its rod 15 are beginning the down stroke and the lug 48 is therefore pressing against the spring 44 which is slightly bent at its apex so that the lug 48 will exert a downward pull before it presses past the spring. The downward pull exerted by the lug 48 opens the valve 34 and permits the liquid to flow out of the receiver R into the conduit 32 and the gasolene tank or other receptacle into which the hose 32 discharges. Parts shown in the drawing are in the position in which they deliver liquid to the gasolene tank or other receptacle. After the lug 48 passes the spring 44 and just before the piston 14 completes its down stroke, the lug 48 engages the end 43 of the operating rod 38 and through the connections of the rod 38, lever 36 and the rod 35, the valve 34 is restored to its seat 33 to close the outlet of the receiver R. The usual arrangement is such that the piston 14 is adjusted to deliver a certain exact quantity to the receiver R, but if the quantity is shown to be less by the markings on the receiver, the customer will, of course, not be charged for the full amount which the piston is supposed to deliver. The check valve 24 prevents the return of the gasolene from the pipe 22 to the cylinder 11. Just before the piston reaches the limit of its upward movement, the lug 48 forces pass the apex 47 of the spring 44, but this does not operate the valve 34 since the thrust is in the upward direction and the valve is already seated. In order to open the valve 34, the crank handle 20 must be reversed and this moves the lug 48 downwardly against the apex 47 of the spring 44 thrusting the operating rod 38 downwardly and lifting the valve 34 off its seat, thereby permitting the measured quantity of gasolene to flow out of the receiver through the conduit 32 and into a tank or receptacle. As the breakage of the glass cylinder 27 would expose the apparatus and building containing it to fire, I surround this cylinder with a steel wire jacket 50 of any suitable mesh which acts as a protection to the glass and yet permits the customer to observe the amount of gasolene which he is getting.

While the attachment has been shown and described in detail, it is to be understood that various changes may be made in the structure without departing from the spirit of the invention.

Having described the invention what is claimed and desired to be secured by Letters Patent is:

1. In a liquid vending machine, the combination with a liquid container, of a piston for delivering liquid therefrom, a rod connected to said piston and extending upwardly above the same and having a lug thereon, means for reciprocating said rod and the piston connected to it, a receiver supported above said container and piston, a pipe leading from said container to the upper end of said receiver, said receiver having a transparent portion marked so that the amount of liquid therein may be observed and determined, said receiver also having an outlet in its lower end, a valve controlling said outlet, and mechanism for operating said valve comprising devices connected to said valve, one of said devices being engageable by the lug on the piston rod to open the valve at the upper end of its stroke and another of said devices being engageable by said lug to close the valve at the lower end of its stroke.

2. In a liquid vending machine, the combination with a liquid container, of a piston for delivering liquid therefrom, an operating rod connected to said piston extending through the top of said container and having a lug thereon, a receiver mounted above said container, a pipe leading from said liquid container to said receiver, a check valve in said pipe at the point where it connects to said container, said receiver having an outlet, a valve controlling the flow of liquid through said outlet, and operating mechanism for said valve comprising a valve rod connected to said valve, a pivoted lever on said receiver pivotally connected at one end to said valve rod, a longitudinally movable rod pivoted to the other end of said lever and extending down along said piston rod and provided with two longitudinally separated projections in the path of the lug on the piston rod.

3. In a liquid vending machine, the combination with a liquid container, of a piston for delivering liquid therefrom, an operating rod connected to said piston extending through the top of said container and having a lug thereon, a receiver mounted above said container, a pipe leading from said liquid container to said receiver, a check valve in said pipe at the point where it connects to said container, said receiver having an outlet, a valve controlling the flow of liquid through said outlet, and operating mechanism for said valve comprising a valve rod connected to said valve, a pivoted lever on said receiver pivotally connected at one end to said valve rod, a longitudinally movable rod pivoted to the other end of said lever and extending down along said piston rod and provided with two longitudinally separated projections in the path of the lug on the piston rod, the upper projection being in the form of a spring with a tapered point over which the lug may be passed.

4. In a liquid vending machine, the combination with a liquid container, of a piston for delivering liquid therefrom, a piston rod connected to said piston extending up from the top of said container and provided with a lug, a receiver above said container, having an outlet, a valve controlling the flow of liquid through said outlet, a rod extending along said piston rod provided with longitudinally separated projections in the path of said lug on said piston rod, and means so connected to said rod at the top and to said valve that the valve will be opened and closed by longitudinal movement of said rod.

In testimony whereof we affix our signatures.

WALTER W. KILPATRICK.
EUGENE T. BOOTH.